United States Patent [19]

Noguki et al.

[11] Patent Number: 5,132,382

[45] Date of Patent: Jul. 21, 1992

[54] METHOD FOR THE PREPARATION OF A POLYVINYL CHLORIDE RESIN POWDER WITH IMPROVED FLOWABILITY

[75] Inventors: Genji Noguki; Toshimichi Koga, both of Ibaraki; Tadashi Amano, Kanagawa, all of Japan

[73] Assignee: Shin-Etsu Chemical Co., Ltd., Tokyo, Japan

[21] Appl. No.: 651,761

[22] Filed: Feb. 7, 1991

[30] Foreign Application Priority Data

Feb. 16, 1990 [JP] Japan ................................. 2-35530

[51] Int. Cl.$^5$ ............................. C08F 2/20; C08F 2/18
[52] U.S. Cl. ........................................ 526/210; 526/216
[58] Field of Search .................. 526/210, 78, 81, 216

[56] References Cited

U.S. PATENT DOCUMENTS 3,706,722  12/1972  Nelson ........................... 526/344.2

Primary Examiner—Christopher Henderson
Attorney, Agent, or Firm—Henry T. Burke

[57] ABSTRACT

An improvement is proposed for decreasing triboelectric static charging of a polyvinyl chloride resin powder so as to improve the flowability of the powder and prevent a decrease in the bulk density of the powder due to static electricity. The improvement comprises, in the polymerization process of vinyl chloride monomer in an aqueous medium, adding, to the aqueous polymerization mixture, a specified amount of an aqueous dispersion containing a salt of a long-chain carboxylic acid with a divalent metal and an ester of sorbitan with a long-chain carboxylic acid in a specified weight proportion and in a specified total concentration at a moment when conversion of the monomer to polymer is at least 70%.

4 Claims, No Drawings

METHOD FOR THE PREPARATION OF A POLYVINYL CHLORIDE RESIN POWDER WITH IMPROVED FLOWABILITY

BACKGROUND OF THE INVENTION

The present invention relates to a method for the preparation of a polyvinyl chloride resin by the polymerization of vinyl chloride monomer dispersed in an aqueous polymerization medium or, more particularly, to a method for the preparation of a polyvinyl chloride resin powder having excellent flowability.

It is a conventional process in the prior art that a vinyl chloride-based polymeric resin is prepared by dispersing and polymerizing vinyl chloride monomer or a monomer mixture mainly composed of vinyl chloride monomer in an aqueous polymerization medium containing a dispersing agent, polymerization initiator and the like to produce a polymerizate slurry which is then dehydrated and dried into a resin powder.

One of the serious drawbacks frequently encountered in the above mentioned process is that the resin powder of polyvinyl chloride is charged with static electricity in the course of drying or during transportation to decrease flowability sometimes causing heavy blockage of the drying oven or pneumatic pipe line for transportation. In addition, the bulk density of a resin powder is remarkably decreased when the powder is electrostatically charged to cause an error in the volumetric measurement of the amount in place of the measurement by weight. This drawback due to electrostatic charging of the resin powder is more serious in winter of low temperature and low humidity than in summer.

Various proposals and attempts of course have been made in the prior art to solve the problem due to the electrostatic charging of a polyvinyl chloride resin powder. A conventional method most widely undertaken is to admix the resin powder with a surface active agent, which may be non-ionic, anionic or cationic, so as to impart the surface of the resin particles with increased water-retentivity or hydrophilicity. This method, however, is not always quite effective for the purpose of preventing decrease in the bulk density or flowability of the resin powder and, in addition, has a disadvantage that the thermal stability of the resin is greatly decreased.

SUMMARY OF THE INVENTION

The present invention accordingly has an object to provide a novel method for the preparation of a vinyl chloride-based polymeric resin powder which is prevented from decrease in the bulk density or flowability due to electrostatic charging of the resin particles without adversely affecting the quality of the resin powder such as thermal stability.

Thus, the present invention provides an improvement which comprises, in a process for the preparation of a vinyl chloride-based polymeric resin powder by suspending and polymerizing vinyl chloride monomer or a monomer mixture mainly composed of vinyl chloride in an aqueous medium to form a polymerization mixture, admixing the polymerization mixture with an aqueous dispersion containing (A) a salt of monobasic carboxylic acid having from 10 to 20 carbon atoms in a molecule with a divalent metal selected from the group consisting of calcium, zinc, barium and magnesium, having an average particle diameter not exceeding 100 μm, and (B) a sorbitan carboxylate having an HLB of 4 to 10 and represented by the general formula

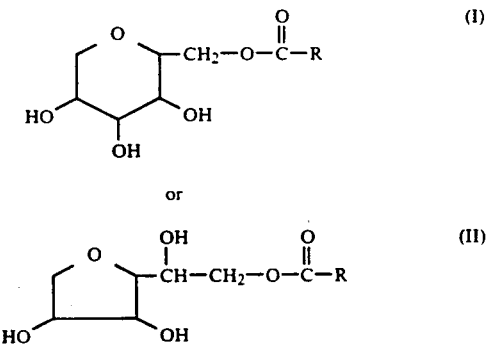

in which R is a monovalent hydrocarbon group having 10 to 20 carbon atoms, in a weight ratio of (A):(B) in the range from 1:10 to 2:1 and in a total amount of (A) and (B) in the range from 5% to 20% by weight in the aqueous dispersion, the amount of the aqueous dispersion added to the polymerization mixture being in the range from 0.01 to 1.5 parts by weight as the total of (A) and (B) per 100 parts by weight of the vinyl chloride monomer or the monomer mixture mainly composed of vinyl chloride, at a moment when conversion of the monomer or monomer mixture into polymer is at least 70% but before dehydration of the polymer particles.

DETAILED DESCRIPTION OF THE PREFERRED EMBODIMENTS

As is described above, the most characteristic feature in the improvement according to the invention consists in the admixture of the polymerization mixture with specific additives (A) and (B) defined above in the form of an aqueous dispersion containing (A) and (B) in a specified total amount and in a specified weight proportion, the amount of the additives in the form of an aqueous dispersion added to the polymerization mixture and the moment of addition thereof also being specified.

The additive (A) is a salt of a monobasic carboxylic acid having 10 to 20 carbon atoms in a molecule and a divalent metal selected from the group consisting of calcium, zinc, barium and magnesium. The monobasic carboxylic acid, which may be saturated or unsaturated, having 10 to 20 carbon atoms in a molecule is exemplified by stearic acid, capric acid, lauric acid, palmitic acid, oleic acid and the like. Accordingly, suitable divalent metal salts of the carboxylic acid include calcium stearate, zinc stearate, barium stearate, magnesium stearate, calcium caprate, zinc caprate, barium stearate, magnesium stearate, calcium caprate, zinc caprate, barium caprate, calcium laurate, zinc laurate, barium laurate, calcium palmitate, zinc palmitate, barium palmitate, calcium oleate, zinc oleate, barium oleate and the like though not particularly limited thereto.

It is essential that the above mentioned divalent metal salt of the carboxylic acid is in the form of a powder having an average particle diameter not exceeding 100 μm or, preferably, not exceeding 20 μm. When the average particle diameter thereof is too large, no stable aqueous dispersion can be obtained by dispersing the powder in water in addition to the less remarkable effect on the improvement of the flowability of the resin powder.

The additive (B) in the aqueous dispersion is an ester of sorbitan with a carboxylic acid having 11 to 21 carbon atoms in a molecule, which should have an HLB in the range from 4 to 10. Examples of suitable sorbitan ester include sorbitan monopalmitate, sorbitan monostearate, sorbitan monooleate, sorbitan monolaurate and the like though not particularly limitative thereto.

The aqueous dispersion of the additives (A) and (B) should contain (A) and (B) in a weight ratio (A):(B) in the range from 1:10 to 2:1. When the relative amount of the additive (A) is too small, no sufficient improving effect can be obtained by the addition of the aqueous dispersion to the polymerization mixture to prevent a decrease in the flowability and bulk density of the resin powder. When the relative amount of the additive (A) is too large, on the other hand, stability of the aqueous dispersion is decreased consequently giving no sufficient improving effect on the flowability of the resin powder.

The aqueous dispersion should contain the additives (A) and (B) in such amounts that the total concentration of (A) and (B) in the dispersion is in the range from 5% to 20% by weight. When the total concentration of (A) and (B) is too small, stability of the aqueous dispersion is decreased. When the total concentration of (A) and (B) is too large, on the other hand, the aqueous dispersion would have an increased consistency so that the dispersion is sometimes not fully uniform and a difficulty is encountered in the transportation of the aqueous dispersion through a pipe line.

The procedure for the preparation of the aqueous dispersion is not particularly limitative and any conventional stirrers and dispersing machines can be used for the purpose including homogenizers, colloid mills, jet mixers and the like. If desired, either of the additives (A) and (B) is melted beforehand and introduced into water in a molten state to be dispersed in water by agitation. It is also optional that the additives are dissolved in an organic solvent such as methyl alcohol, ethyl alcohol, ethyl acetate and the like and introduced into water in the form of a solution to be dispersed in water by agitation.

The above described aqueous dispersion of the additives (A) and (B) is introduced into the polymerization mixture at a moment when the conversion of the monomer or monomer mixture into polymer is at least 70% but before dehydration of the polymerizate slurry in such an amount that the total amount of the additives (A) and (B) is in the range from 0.01 to 1.5 parts by weight per 100 parts by weight of the vinyl chloride monomer or a monomer mixture mainly composed of vinyl chloride. When the aqueous dispersion is introduced into the polymerization mixture at a too early moment, troubles are caused by the heavy deposition of polymer scale on allover the inner walls of the polymerization reactor. When the added amount of the aqueous dispersion is too small, the desired effect cannot be obtained as a matter of course for the improvement in the flowability and bulk density of the resin powder. On the other hand, no further improvement can be obtained by increasing the added amount of the aqueous dispersion to exceed the above mentioned upper limit rather with an economical disadvantage.

The method according to the present invention is applicable not only to the homopolymerization of vinyl chloride monomer alone in an aqueous medium but also to the copolymerization of a monomer mixture of which, for example, at least 50% by weight is vinyl chloride. Examples of the comonomer in the monomer mixture to be copolymerized with vinyl chloride include vinyl esters such as vinyl acetate and vinyl propionate, esters of acrylic or methacrylic acid such as methyl acrylate, ethyl acrylate, methyl methacrylate and ethyl methacrylate, olefins such as ethylene and propylene, vinyl ethers such as lauryl vinyl ether and isobutyl vinyl ether, maleic anhydride, acrylonitrile, styrene, vinylidene chloride and the like. Two kinds or more of these comonomers can be used in combination according to need.

The procedure for the polymerization of the monomer or monomer mixture according to the invention can be conventional excepting the addition of the specific aqueous dispersion of the additives to the polymerization mixture at a specified moment. Namely, the vinyl chloride monomer or monomer mixture is introduced into an aqueous medium containing a dispersing agent and dispersed therein before start of the polymerization reaction with addition of a polymerization initiator. The above mentioned disersing agent is not particularly limitative and any of conventionally used ones can be used. Examples of suitable dispersing agents include water-soluble cellulose ethers such as methyl cellulose, ethyl cellulose, hydroxyethyl cellulose, hydroxypropyl cellulose and hydroxypropyl methyl cellulose, water-soluble or monomer-soluble partially saponified polyvinyl alcohols, poly(acrylic acid), water-soluble natural polymers such as gelatin, monomer-soluble surface active agents such as sorbitan monolaurate, sorbitan trioleate, sorbitan monostearate, glycerin tristearate and block copolymers of ehtylene oxide and propylene oxide, water-soluble surface active agents such as polyoxyethylene sorbitan monolaurate, polyoxyethylene glycerin oleate, sodium laurate and sodium dodecylbenzene solfonate, inorganic powders such as calcium carbonate and calcium phosphate and so on. These dispersing agents can be used either singly or as a combination of two kinds or more according to need.

The polymerization initiator also can be any of conventional ones used in the polymerization of vinyl chloride in the prior art. Examples of suitable polymerization initiators include percarbonate compounds such as diisopropylperoxy dicarbonate, di-2-ethylhexylperoxy dicarbonate and diethoxyethylperoxy dicarbonate, perester compounds such as tert-butylperoxy neodecanoate, tert-butylperoxy pivalate, tert-hyxylperoxy pivalate, α-cumylperoxy neodecanoate and 2,4,4-trimethylpentyl-2-peroxy 2-neodecanoate, peroxides such as acetyl cyclohexylsulfonyl peroxide, 2,4,4-trimethylpentyl-2-peroxy phenoxy acetate, 3,5,5-trimethyl hexanoyl peroxide and lauroyl peroxide, azo compounds such as azobis-2,4-dimethyl valeronitrile and azobis(4-methoxy-2,4-dimethyl valeronitrile), potassium persulfate, ammonium persulfate, hydrogen peroxide, cumene hydroperoxide and the like. These polymerization initiators can be used either singly or as a combination of two kinds or more according to need.

The other conditions for practicing the polymerization of the monomer or monomer mixture, besides the selection of the dispersing agent and polymerization initiator, can also be conventional including the method for introducing the aqueous medium, monomer or monomer mixture, dispersing agent, polymerization initiator and the like into the polymerization reactor, proportion of these constituents to form the polymerization mixture, polymerization temperature and so on.

It is further optional to use various kinds of known additives conventionally used in the preparation of a vinyl chloride-based polymeric resin with an object to moderately controlling the polymerization reaction or improving the properties of the resin product by adding into the polymerization mixture either before the start of, during proceeding of or after completion of the polymerization reaction. Examples of such optional additives include polymerization-controlling agents, chain transfer agents, pH controlling agents, gelation improvers, antistatic agents, crosslinking agents, stabilizers, fillers, buffering agents, scale-deposition inhibitors and the like.

In the following, the method for the preparation of a vinyl chloride-based polymer according to the inventive improvement is illustrated in more detail by way of examples and comparative examples although the scope of the present invention is never limited by these examples.

EXAMPLE 1

Experiments 1 to 8

In Experiment 1, an aqueous dispersion of zinc stearate having an average particle diameter of 20 μm and sorbitan monolaurate having an HLB of 8.6 in a weight ratio of 1:2 was prepared beforehand in a concentration of 18% by weight as a total amount of these two kinds of additives. Thus, a half amount of the sorbitan ester was first added to water under agitation to be uniformly dispersed therein followed by the addition of the entire amount of zinc stearate which was then uniformly dispersed by further continued agitation. Thereafter, the remainder portion of the sorbitan ester was added to the dispersion and agitation was further continued for 4 hours to give an aqueous dispersion of the additives which was stable not to cause phase separation by standing for 2 hours or longer.

Into a stainless steel-made polymerization reactor of 2000 liter capacity were introduced 980 kg of deionized water, 382 g of a partially saponified polyvinyl alcohol and 143 g of a water-soluble methyl cellulose and, after evacuation of the reactor to exclude the atmospheric air, 700 kg of vinyl chloride monomer were introduced into the reactor to form a polymerization mixture. Further, 280 g of di-2-ethylhexylperoxy dicarbonate were introduced into the polymerization mixture in the reactor under agitation by using a high-pressure pump to start the polymerization reaction with simultaneous start of temperature elevation up to 58° C. The polymerization reaction was continued at this temperature under continuous agitation of the polymerization mixture. At a moment when conversion of the monomer to polymer had reached 85%, the aqueous dispersion of the additives prepared separately beforehand was added to the polymerization mixture in an amount of 0.3 part by weight as the total of the zinc stearate and sorbitan ester per 100 parts by weight of the vinyl chloride monomer and the polymerization reaction was further continued. When the pressure inside the polymerization reactor had dropped to 5.5 kg/cm$^2$G, the polymerization reaction was terminated and the unreacted monomer was recovered. The polymerizate slurry was discharged out of the reactor and dehydrated and dried in a conventional manner to give a polyvinyl chloride resin powder.

In Experiment 2, the same procedure as above was repeated excepting replacement of the zinc stearate with the same amount of calcium stearate.

The polymerization procedure in Experiment 3 was just the same as in Experiment 2 except that the amount of the aqueous dispersion of the additives was decreased to 0.1 part by weight as the total of calcium stearate and sorbitan ester per 100 parts by weight of the vinyl chloride monomer.

The polymerization procedure in Experiment 4 was just the same as in Experiment 1 excepting replacement of the zinc stearate with the same amount of barium stearate.

In Experiment 5 undertaken for comparative purpose, the polymerization was performed in the same manner as in the preceding experiments but without addition of the aqueous dispersion of the additives in the course of the polymerization reaction.

The polymerization procedure in Experiment 6 was just the same as in Experiment 1 excepting replacement of the zinc stearate with the same amount of calcium acetate and the sorbitan monolaurate with the same amount of sorbitan monostearate having an HLB of 4.7.

The polymerization procedure in Experiment 7 was just the same as in Experiment 1 excepting replacement of the sorbitan monolaurate with the same amount of sorbitan trioleate having an HLB of 1.8.

In Experiment 8, the polymerization was performed in the same manner as in Experiment 1 except that the aqueous dispersion of the additives was not added and, instead, 0.3 part by weight of an amine-based cationic surface active agent was added per 100 parts by weight of the vinyl chloride monomer at the same moment as in Experiment 1.

Each of the thus prepared eight polyvinyl chloride resin powders was subjected to the evaluation tests for the items I to V under the testing conditions described below to give the results shown in Table 1.

I. Flowability Under Normal Condition

The resin powder was conditioned by keeping for 24 hours in an atmosphere of 35% relative humidity at 27° C. (Condition A) or 40% relative humidity at 0° C. (Condition B) and a 100 ml portion of the powder was taken and put into the funnel for the determination of bulk density specified in JIS K 6721. The time in seconds taken for free flow-down of the resin powder out of the funnel was recorded as a measure of the flowability. The Conditions A and B are referred to in Table 1 merely as A and B, respectively.

II. Flowability After Triboelectrical Charging

The resin powder after conditioning under the Condition A or B was agitated for 5 minutes using the planetary mixer manufactured by Brabender Co. rotating at 60 rpm and then subjected immediately to the measurement of the flowability by the method described above.

III. Bulk Density Under Normal Condition

The resin powder after conditioning under the Condition A or B described above was subjected to the measurement of the bulk density in g/cm$^3$ according to the testing procedure specified in JIS K 6721.

IV. Bulk Density After Triboelectrical Charging

The same resin powder samples as used in the above mentioned test for the flowability after triboelectrical charging were subjected to the measurement of the bulk density in g/cm³ in the same manner as above.

V. Thermal Stability

The resin powder was compounded with 2.5 PHR (parts per hundred parts of resin) of lead stearate, 0.7 PHR of barium stearate, 0.5 PHR of tribasic lead sulfate and 30.0 PHR of dioctyl phthalate and, after milling for 5 minutes on a roller mill at 165° C., the compound was shaped into a sheet of 1 mm thickness. The sheet was kept in an oven at 195° C. and the time in minutes taken for blackening of the sheet was recorded as a measure of the thermal stability of the resin.

EXAMPLE 2

Experiments 9 to 13

The polymerization procedure in Experiments 9, 10 and 11 was substantially the same as in Experiment 2 except that the calcium stearate powder used as the additive in the aqueous dispersion had an average particle diameter of 8 μm, 50 μm and 150 μm, respectively. The aqueous dispersions prepared in Experiments 9 and 10 had good stability without phase separation after standing for 2 hours or longer while the aqueous dispersion prepared in Experiment 11 had poor stability to cause phase separation within 30 minutes of standing.

The polymerization procedure in Experiment 12 was just the same as in Experiment 9 except that the amount of the aqueous dispersion of the additives was decreased to 0.005 part by weight as a total of the calcium stearate and sorbitan ester per 100 parts by weight of the vinyl chloride monomer.

The polymerization procedure in Experiment 13 was about the same as in Experiment 9 except that the aqueous dispersion of the additives contained 25% by weight of the calcium stearate and sorbitan ester as a total. The aqueous dispersion had somewhat poor stability to cause phase separation when it was kept standing for longer than 1 hour.

Each of the thus prepared five polyvinyl chloride resin powders was subjected to the evaluation test in the same manner as in Example 1 to give the results shown in Table 1.

EXAMPLE 3

Experiments 14 to 17

The polymerization procedure in Experiment 14 was substantially the same as in Experiment 9 in Example 2 except that the weight ratio of the calcium stearate and sorbitan ester in the aqueous dispersion was 1:5.

The polymerization procedure in Experiments 15, 16 and 17 was substantially the same as in Experiment 9 except that the weight ratio of the calcium stearate and sorbitan ester in the aqueous dispersion was 1:1, 1:20 and 3:1, respectively, and the aqueous dispersion in each of these experiments contained 10% by weight of the calcium stearate and sorbitan ester as a total. The aqueous dispersion prepared in Experiment 14 had stability as good as in Experiment 9 while the aqueous dispersions prepared in Experiments 15 and 16 had somewhat poorer stability to cause phase separation by standing for longer than 1 hour and the aqueous dispersion in Experiment 17 had very poor stability to cause phase separation already within 30 minutes of standing.

Each of the thus prepared four polyvinyl chloride resin powders was subjected to the evaluation test in the same manner as in Example 1 to give the results shown in Table 1.

EXAMPLE 4

Experiments 18 to 21

The polymerization procedure in each of these experiments was substantially the same as in Experiment 9 except that the aqueous dispersion of the additives was introduced into the polymerization mixture at different moments in the course of the polymerization. Namely, the aqueous dispersion was introduced at a moment when the conversion of the monomer to the polymer was 70% and 60% in Experiments 18 and 21, respectively, just after termination of the polymerization reaction, when conversion of the monomer to polymer was 91%, in Experiments 19 and after recovery of the unreacted vinyl chloride monomer in Experiment 20.

After discharge of the polymerizate slurry out of the polymerization reactor, the inner walls of the reactor were visually inspected to find that almost no polymer scale was deposited in Experiments 18, 19 and 20, like Experiment 9, while the reactor walls in Experiment 21 was covered all over by the polymer scale deposited thereon.

Each of the thus prepared four polyvinyl chloride resin powders was subjected to the evaluation test in the same manner as in Example 1 to give the results shown in Table 1.

TABLE 1

| Experiment No. | Item I, seconds | | Item II, seconds | | Item III, g/cm³ | | Item IV, g/cm³ | | Item V, minutes |
|---|---|---|---|---|---|---|---|---|---|
| | A | B | A | B | A | B | A | B | |
| 1 | 10.6 | 10.9 | 10.5 | 11.0 | 0.570 | 0.575 | 0.571 | 0.572 | 70 |
| 2 | 10.5 | 11.0 | 10.2 | 11.2 | 0.572 | 0.580 | 0.572 | 0.578 | 70 |
| 3 | 10.6 | 11.0 | 10.6 | 11.0 | 0.570 | 0.572 | 0.570 | 0.571 | 70 |
| 4 | 10.5 | 11.1 | 10.7 | 11.4 | 0.569 | 0.568 | 0.570 | 0.569 | 70 |
| 5*2) | 11.4 | 13.5 | *1) | *1) | 0.565 | 0.560 | 0.520 | 0.501 | 65 |
| 6*2) | 12.0 | 12.9 | 15.6 | 18.2 | 0.560 | 0.558 | 0.538 | 0.518 | 65 |
| 7*2) | 11.9 | 12.6 | 16.2 | 19.8 | 0.562 | 0.556 | 0.540 | 0.510 | 65 |
| 8*2) | 11.1 | 12.8 | 11.9 | 17.6 | 0.565 | 0.560 | 0.562 | 0.545 | 50 |
| 9 | — | 11.0 | — | 11.2 | — | 0.580 | — | 0.578 | — |
| 10 | — | 11.6 | — | 13.0 | — | 0.575 | — | 0.570 | — |
| 11*2) | — | 12.5 | — | 18.0 | — | 0.560 | — | 0.540 | — |
| 12*2) | — | 12.2 | — | 17.5 | — | 0.561 | — | 0.542 | — |
| 13*2) | — | 13.5 | — | *1) | — | 0.559 | — | 0.510 | — |
| 14 | — | 10.9 | — | 11.0 | — | 0.580 | — | 0.579 | — |
| 15 | — | 11.2 | — | 11.3 | — | 0.579 | — | 0.579 | — |
| 16*2) | — | 12.3 | — | 18.9 | — | 0.565 | — | 0.521 | — |
| 17*2) | — | 13.6 | — | *1) | — | 0.558 | — | 0.509 | — |
| 18 | — | 11.2 | — | 11.3 | — | 0.578 | — | 0.577 | — |

TABLE 1-continued

| Experiment No. | Item I. seconds | | Item II. seconds | | Item III. g/cm³ | | Item IV. g/cm³ | | Item V. minutes |
|---|---|---|---|---|---|---|---|---|---|
| | A | B | A | B | A | B | A | B | |
| 19 | — | 11.3 | — | 11.2 | — | 0.579 | — | 0.580 | — |
| 20 | — | 11.0 | — | 11.2 | — | 0.577 | — | 0.579 | — |
| 21*2) | — | 13.1 | — | 13.5 | — | 0.541 | — | 0.532 | — |

*1)not discharged out of funnel.
*2)comparative experiment

What is claimed is:

1. In a process for the preparation of a vinyl chloride-based polymeric resin powder by dispersing and polymerizing vinyl chloride monomer or a monomer mixture mainly composed of vinyl chloride in an aqueous medium to form a polymerization mixture, the improvement which comprises admixing the polymerization mixture with an aqueous dispersion containing the additives (A) a salt of stearic acid, capric acid, lauric acid, palmitic acid or oleic acid with a divalent metal selected from the group consisting of calcium, zinc, barium and magnesium, said salt having an average particle diameter not exceeding 100 um, and (B) an ester of sorbitan with a carboxylic acid having from 11 to 21 carbon atoms in a molecule, in a weight ratio of (A):(B) in the range from 1:10 to 2:1 in the aqueous dispersion, the amount of the aqueous dispersion added to the polymerization mixture being in the range from 0.01 to 1.5 parts by weight as the total of (A) and (B) per 100 parts by weight of the vinyl chloride monomer or the monomer mixture mainly composed of vinyl chloride, at a moment when conversion of the monomer or monomer mixture into polymer is at least 70% but before dehydration of the polymer particles.

2. The improvement as claimed in claim 1 in which the additive (A) has an average particle diameter not exceeding 20 μm.

3. The improvement as claimed in claim 1 in which the additive (B) is selected from the group consisting of sorbitan monopalmitate, sorbitan monostearate, sorbitan monooleate, sorbitan monolaurate and sorbitan monolicinolenate.

4. The improvement as claimed in claim 1 in which the aqueous dispersion of the additives (A) and (B) contains the additives (A) and (B) in the range from 5% to 20% by weight as a total.

* * * * *